J. O. CRANK.
SHOCK ABSORBER.
APPLICATION FILED FEB. 25, 1921.
1,407,640.
Patented Feb. 21, 1922.
2 SHEETS—SHEET 2.
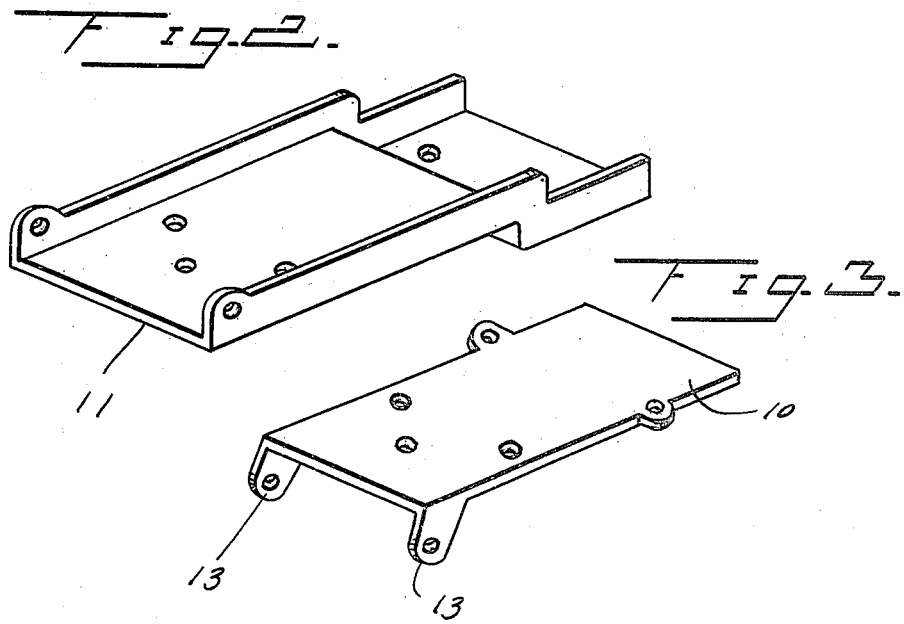
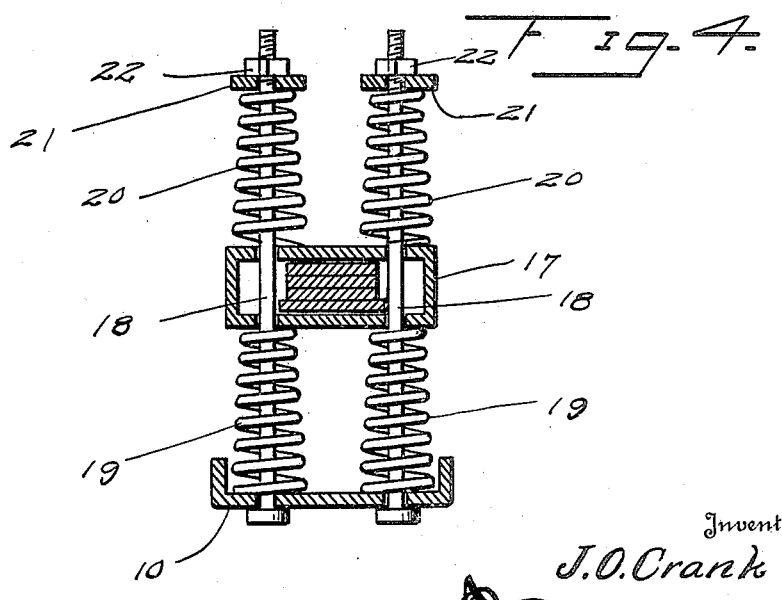

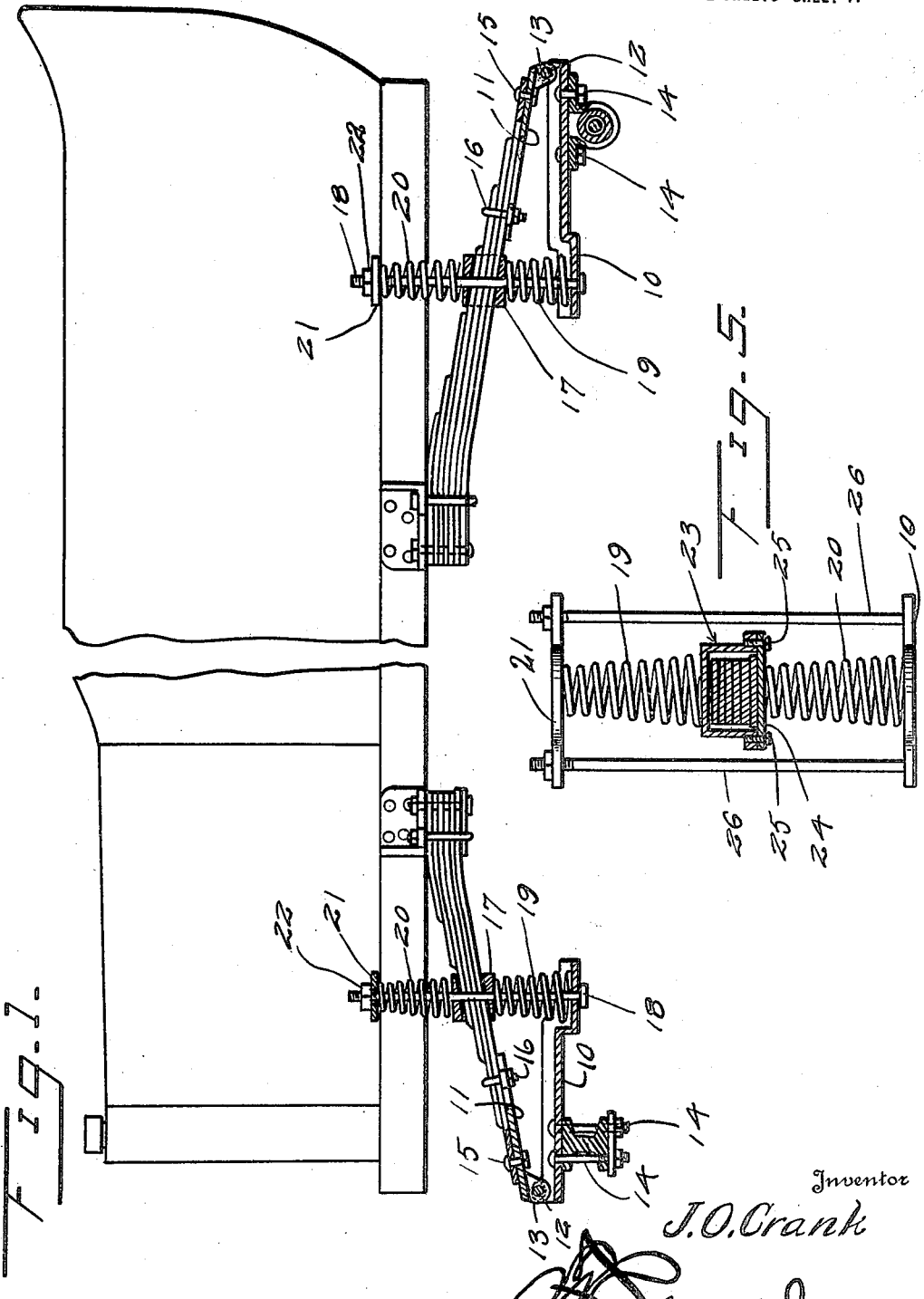

UNITED STATES PATENT OFFICE.

JAMES ORLAND CRANK, OF MENDON, ILLINOIS.

SHOCK ABSORBER.

1,407,640. Specification of Letters Patent. Patented Feb. 21, 1922.

Application filed February 25, 1921. Serial No. 447,745.

*To all whom it may concern:*

Be it known that I, JAMES ORLAND CRANK, a citizen of the United States, residing at Mendon, in the county of Adams and State of Illinois, have invented certain new and useful Improvements in Shock Absorbers; and I do hereby declare the following to be a full, clear, and exact description of the invention, such as will enable others skilled in the art to which it appertains to make and use the same.

The object of the invention is to provide a shock absorber for use especially in connection with the springs of Chevrolet and similar cars wherein the springs are ordinarily hinged directly to the axles or to clips on the axles and which therefore afford no means by which an absorber of a commercial type may be applied or utilized, and it consists essentially of a special means of connection of the spring terminals to the axles affording a shock absorbing feature for cooperation with the springs both at the front and back axles or at either as may be preferred; and with these objects in view the invention consists in a construction and combination of parts of which a preferred embodiment is shown in the drawing, wherein:

Figure 1 is a view of a shock absorber embodying the invention applied to the front and rear springs and axles of a Chevrolet car.

Figure 2 is a detail view of the axle plate of the hinge.

Figure 3 is a similar view of the hinge plate.

Figure 4 is a view of the shock absorber springs and cooperating saddle.

Figure 5 is a sectional view illustrating a modified form of my invention.

The device consists essentially of a hinge member comprising an axle plate 10 and a spring plate 11 pivotally connected as at 12 by a hinge pin engaging perforated ears 13 which extend downward from the plane of the plate as shown in Figure 3.

The axle plate is secured to the axle by means of bolts 14 or any equivalent thereof, while the spring plate is secured to the spring by means of a bolt 15 and a clip 16.

Engaging the spring at an interval from its extremity is a saddle 17 through the extremities of which extend bolts 18 upon which are arranged springs 19 and 20 arranged in opposing relation, the inner ends of said springs bearing against the saddle while the remote ends thereof bear respectively against the axle plate at the end and washers 21 which are held in place by nuts 22 threaded upon the extremities of the bolts, or like fastening means as may be preferred in practice.

It will be seen that the spring carried plate of the hinge partakes of the motions of the spring and is opposed and cushioned in its movement in either direction by the opposed spring elements 19 and 20 which are preferably of the conical or spiral form indicated in the drawing and may be of a tension and resistance suited to the weight of the car.

It will be noted that the only modification in the arrangement of the springs as they are now disposed upon cars of the type indicated resides in the interposition of the hinge with its cushioning or shock absorbing spring feature between the terminal of the vehicle spring and the axle, or the substitution of said hinge for the clip ordinarily employed in this connection as a hinge connection between the terminal of the spring and the axle, the other functions of the vehicle spring remaining the same as in the usual practice while the tendency of the spring to break at or near the joint with the axle or axle clip is minimized by relieving the shock or jar incident to traversing rough roads and incident to the abrupt rebound or recoil of the spring after encountering an obstruction.

Referring to Figure 5 which illustrates a modified form of my invention, a saddle 23 is provided for the vehicle spring which is constructed with a removable part 24 to facilitate the application of the saddle to the vehicle spring. The removable part is held in place by fasteners 25 and said saddle is engaged by the springs 19 and 20 which engage the axle plate 10 and the plate 21 and said plates are connected by the rods 26. In this form of my invention, the saddle is disposed between said rods and is free therefrom.

Having thus described the invention, what I claim is:—

In combination, a main spring interposed between a vehicle frame and axle and having one end fixed to the frame, and the free end elastically connected to the axle, an axle plate secured to the axle and projecting forwardly and rearwardly of the latter, a spring plate hinged to the forward end of the axle plate and secured to the free ends of the main spring, said axle plate having its other end offset to form a seat, a saddle secured to the main spring, and shock absorbing means associated with the saddle and engaging the seat of the axle plate.

In testimony whereof I affix my signature in presence of two witnesses.

JAMES ORLAND CRANK.

Witnesses:
J. DEAN McNAY,
JESSE E. CRANK.